(12) United States Patent
Cheng et al.

(10) Patent No.: US 7,583,187 B1
(45) Date of Patent: Sep. 1, 2009

(54) SYSTEM, METHOD AND COMPUTER PROGRAM PRODUCT FOR AUTOMATICALLY SUMMARIZING SECURITY EVENTS

(75) Inventors: Lebin Cheng, Fremont, CA (US); Vasantkumar Balakrishnan, San Jose, CA (US)

(73) Assignee: McAfee, Inc., Santa Clara, CA (US)

( * ) Notice: Subject to any disclaimer, the term of this patent is extended or adjusted under 35 U.S.C. 154(b) by 106 days.

(21) Appl. No.: 11/484,082

(22) Filed: Jul. 11, 2006

(51) Int. Cl.
*G08B 29/00* (2006.01)

(52) U.S. Cl. .................. 340/506; 340/3.1; 340/825.36; 340/825.49

(58) Field of Classification Search .................. 340/506, 340/3.1, 825.36, 825.49
See application file for complete search history.

(56) References Cited

U.S. PATENT DOCUMENTS

| | | | |
|---|---|---|---|
| 5,400,246 A | * | 3/1995 | Wilson et al. .................. 700/17 |
| 6,664,958 B1 | | 12/2003 | Leather et al. .............. 345/422 |
| 6,704,874 B1 | | 3/2004 | Porras et al. ................. 713/201 |
| 2003/0221123 A1 | | 11/2003 | Beavers ...................... 713/201 |

FOREIGN PATENT DOCUMENTS

WO          WO 02/19077          3/2002

OTHER PUBLICATIONS

"eTrust" eTrust:Trust Systems http://etrust.org Jul. 11, 2006.
"TriGeo Network Security" http://www.trigeo.com/ Jul. 11, 2006.
"Artbase7 Is Here" http://www.artsigt.com Jul. 11, 2006.
"TippingPoint, A Division of 3Com" http://www.tippingpoint.com Jul. 11, 2006.
"Cisco Systems" http://www.cisco.com Jul. 11, 2006.
"ISS" http://www.iss.com Jul. 11, 2006.

* cited by examiner

*Primary Examiner*—Daryl Pope
(74) *Attorney, Agent, or Firm*—Zilka-Kotab, PC

(57) ABSTRACT

A security system, method and computer program product are provided. In use, a selection of at least one security event attribute is received. In addition, a subset of a first set of security events is displayed based on the at least one selected security event attribute. Moreover, information associated with the at least one selected security event attribute is stored. Such information is further capable of being used to subsequently and automatically summarize a subset of a second set of security events.

22 Claims, 7 Drawing Sheets

SYSTEM, METHOD AND COMPUTER PROGRAM PRODUCT FOR AUTOMATICALLY SUMMARIZING SECURITY EVENTS

FIELD OF THE INVENTION

The present invention relates to security applications, and more particularly to applications for reporting security events.

BACKGROUND

Increasingly, computer systems have needed to protect themselves against unwanted code and related attacks. Such unwanted code has generally taken the form of viruses, worms, Trojan horses, spyware, adware, and so forth. Such unwanted code is often injected by an person that intrudes upon a target network. The damage and/or inconvenience capable of being incurred by these types of unwanted code/attacks has ranged from mild interference with a program, such as the display of an unwanted political message in a dialog box, to the complete destruction of contents on a hard drive, and even the theft of personal information.

Various systems have been developed for combating such unwanted code/attacks. One example includes intrusion prevention systems (IPSs). In use, an IPS monitors network traffic and typically has the ability to take immediate action, based on a set of rules established by a user. Often IPSs are equipped with graphical user interfaces for allowing the user to view various potential security events (e.g. alerts, etc.) that are collected from a plurality of sensors dispersed within one or more networks.

Since hundreds of sensors may potentially exist, the aforementioned security events may be received at a very high rate (e.g. up to hundreds of alerts per minute, etc.). Thus, a user may easily be overwhelmed by the volume of security events, making it difficult for him/her to pay attention to a truly severe security breach, etc. In order to address the need of the user to deal with such abundance of information, some IPSs have provided highly flexible view customization/aggregation functions to allow an administrator to group, filter, and sort security events.

Still yet, some IPSs allow a user to configure rules which govern the manner in which security events may be automatically correlated and combined into "incidents." Such process is called correlation. While such correlation has the potential of significantly improving the effectiveness of the IPS, configuration of the aforementioned rules is difficult. For example, users must often manually enter security event attributes of interest into the IPS for generation of a desired rule that is capable of filtering security events with such attribute.

There is thus a need for overcoming these and/or other problems associated with the prior art.

SUMMARY

A security system, method and computer program product are provided. In use, a selection of at least one security event attribute is received. In addition, a subset of a first set of security events is displayed based on the at least one selected security event attribute. Moreover, information associated with the at least one selected security event attribute is stored. Such information is further capable of being used to subsequently and automatically summarize a subset of a second set of security events.

DETAILED DESCRIPTION

Figure 1:
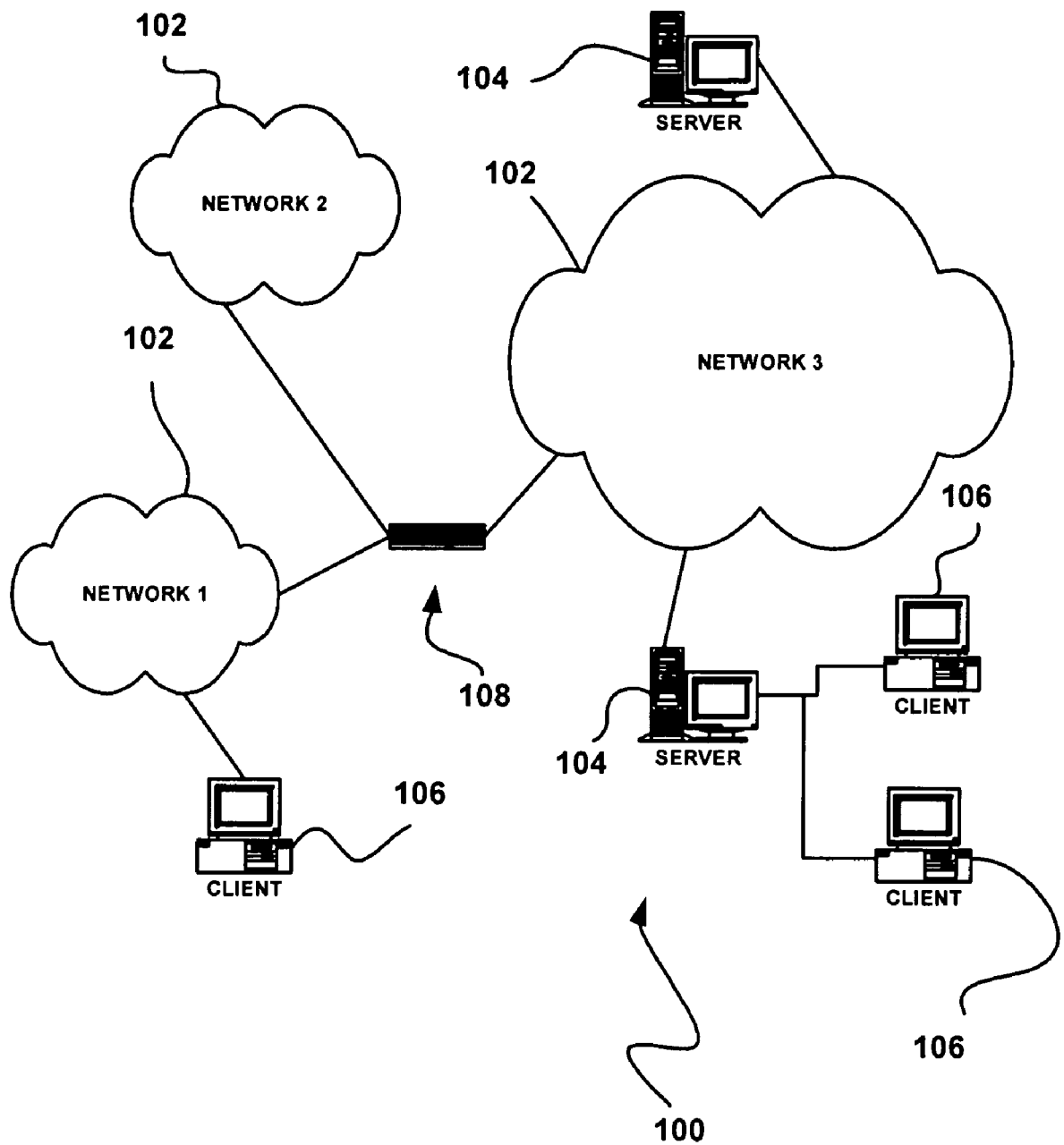
FIG. 1 illustrates a network architecture, in accordance with one embodiment.

FIG. 1 illustrates a network architecture 100, in accordance with one embodiment. As shown, a plurality of networks 102 is provided. In the context of the present network architecture 100, the networks 102 may each take any form including, but not limited to a local area network (LAN), a wireless network, a wide area network (WAN) such as the Internet, peer-to-peer network, etc.

Coupled to the networks 102 are server computers 104 which are capable of communicating over the networks 102. Also coupled to the networks 102 and the server computers 104 is a plurality of client computers 106. Such server computers 104 and/or client computers 106 may each include a desktop computer, lap-top computer, hand-held computer, mobile phone, personal digital assistant (PDA), peripheral (e.g. printer, etc.), any component of a computer, and/or any other type of logic. In order to facilitate communication among the networks 102, at least one gateway 108 is optionally coupled therebetween.

Figure 2:
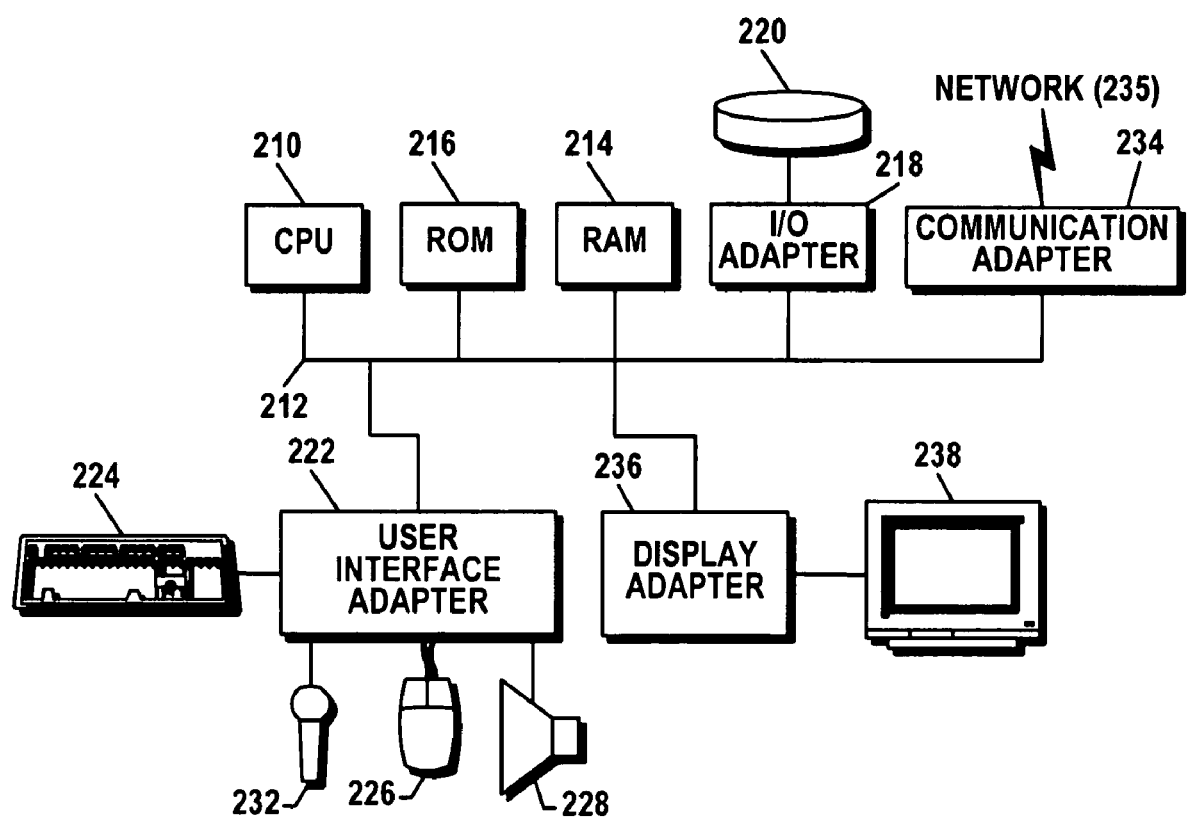
FIG. 2 shows a representative hardware environment that may be associated with the server computers and/or client computers of FIG. 1, in accordance with one embodiment.

FIG. 2 shows a representative hardware environment that may be associated with the server computers 104 and/or client computers 106 of FIG. 1, in accordance with one embodiment. Such figure illustrates a typical hardware configuration of a workstation in accordance with one embodiment having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network 235 (e.g., a data processing network) and a display adapter 236 for connecting the bus 212 to a display device 238.

The workstation may have resident thereon any desired operating system. It will be appreciated that an embodiment may also be implemented on platforms and operating systems other than those mentioned. One embodiment may be written using JAVA, C, and/or C++ language, or other programming languages, along with an object oriented programming methodology. Object oriented programming (OOP) has become increasingly used to develop complex applications.

Of course, the various embodiments set forth herein may be implemented utilizing hardware, software, or any desired combination thereof. For that matter, any type of logic may be utilized which is capable of implementing the various functionality set forth herein.

Figure 3:
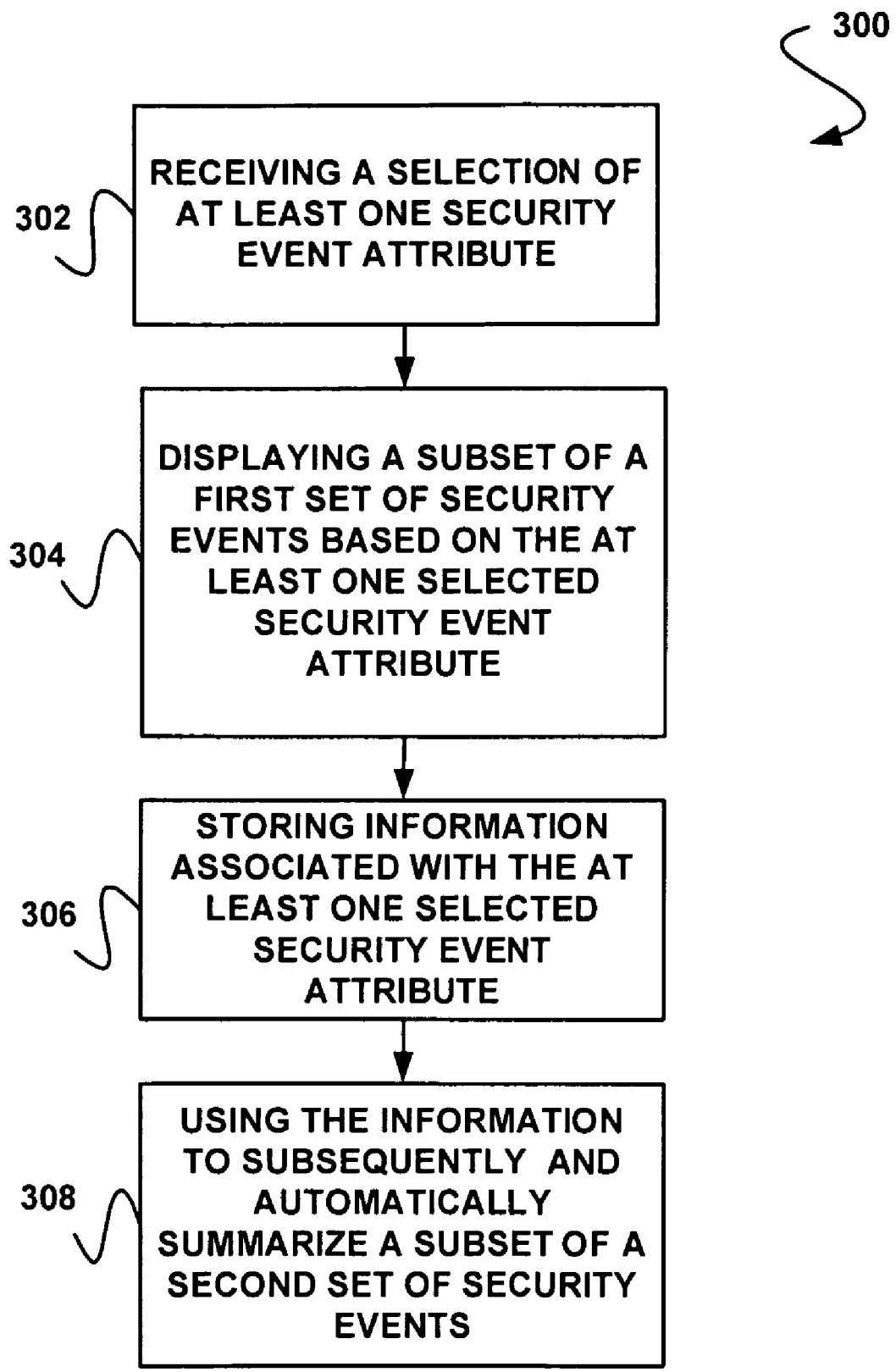
FIG. 3 shows a method for automatically summarizing security events, in accordance with one embodiment.

FIG. 3 shows a method 300 for automatically summarizing security events, in accordance with one embodiment. As an option, the method 300 may be implemented in the context of the architecture and environment of FIGS. 1 and/or 2. Of course, however, the method 300 may be carried out in any desired environment.

As shown in operation 302, a selection of at least one security event attribute is received. The selection may be received manually or automatically. In addition, the selection may be received utilizing a graphical user interface (GUI). In still another embodiment, the selection may be accomplished by receiving a set of selection criteria associated with the security event attribute. Of course, however, the selection may be received in any desired manner that results in the identification of the at least one security event attribute.

Moreover, the security event may include any representation of a security event that has been identified on a computer and/or network. Just by way of example, such security event may include an intrusion/attack, the downloading of potentially unwanted code (e.g. viruses, worms, Trojan horses, spyware, adware, etc.), a file access request, a registry modification, and/or any other event capable of being performed and/or identified on a computer and/or network and which has at least a potential of affecting security. As an option, the computer and/or network may include any of the computers and/or networks described above with respect to FIGS. 1 and/or 2.

Thus, the security event attribute may include any attribute capable of being associated with a security event. In various optional embodiments, the security event attribute may include a severity level (e.g. high, medium, low, etc.) indicating a potential damage of an attack(s), a type indicating a general intrusion mechanism, a source Internet Protocol (IP) address indicating an origin of the attack(s), a sensor identifier identifying a sensor that detected the attack(s), a target IP address indicating an intended victim, an intended victim host network application port that an attack packet(s) targeted, etc. Of course, such security event attributes are set forth for illustrative purposes only and should not be construed as limiting in any manner. Furthermore, the security event attribute may be associated with a plurality of security events.

A subset of a first set of security events may then be displayed based on the at least one selected security event attribute. See operation 304. In one embodiment, the subset may include security events that are associated with the selected security event attribute. For example, the subset may include security events that specifically exhibit the same or similar value for a selected security event attribute. It should be noted, however, that any subset may be displayed that is based, at least in part, on the at least one selected security event attribute.

In one embodiment, the first set of security events may include a set of security events that has been identified over a predefined period of time. In other optional embodiments, the first set of security events may be collected during a user-selected time frame. Of course, however, the first set of security events may also be collected during a default time frame.

In various additional embodiments, the first set of security events may be representative of potential network intrusions. Of course, however, the first set of security events may be representative of any desired events capable of being performed and/or identified on a computer and/or network and which has at least a potential of affecting security, as set forth earlier.

Thus, in one embodiment, security events within the first set of security events and associated with the selected attribute may be identified and displayed in the subset. In this way, the selection of the at least one security event attribute in operation 302 may, in various optional embodiments, include a request to drill down into the first set of security events. As a further option, the subset of the first set of security events may be displayed utilizing a graphical user interface. Of course, however, the subset of the first set of security events may be displayed in any desired manner.

Still yet, information associated with the at least one selected security event attribute may be stored, as shown in operation 306. For example, the information may be stored in a database. Of course, however, the information may be stored in any desired manner. Also, the information may or may not be stored in real-time, along with any other desired optional functionality (e.g. incident generation, etc.). In one particular embodiment, such information may take the form of, for example, configuration information (e.g. a control mask, etc.). Optionally, such control mask may include at least one rule, policy and/or filter associated with the security event attribute. More information regarding such embodiment will be set forth hereinafter in greater detail during reference to subsequent figures.

In another optional embodiment, the information may include at least one filter. The filter may include a program that filters security events based on the security event attribute. Still yet, the information may include a plurality of filters. For example, the information may include at least one filter for each of a plurality of selected security event attributes. Thus, each selected security event attribute may be associated with a filter.

It should be noted that any information capable of being associated with at least one selected security event may be stored. In addition, the subset of the first set of security events may be displayed, as set forth in operation 304, repeatedly, such that information associated with a plurality of selected security event attributes may be stored in a repeated manner. In particular, for each selected security event attribute, a subset of a first set of security events associated with such attribute may be displayed and information associated with therewith may be stored.

Furthermore, the information may be used to subsequently and automatically summarize a subset of a second set of security events, as shown in operation 308. Similar to the first set, the second set of security events may include a set of security events that have been identified over a predefined period of time, etc. For example, the second set of security events may be collected during a second user-selected time frame. At least a portion of such second user-selected time frame may optionally be subsequent to the first user-selected time described above with respect to operation 304. Of course, however, the second set of security events may take any form similar to or different from the first set.

Just by way of example, in one optional embodiment, the subset of security events may be summarized to reduce a number of security events that are displayed. Specifically, the subset of the second set of security events may be summarized into a single event. In this way, security events in the second set of security events may be correlated, at least in part, by a selected security event attribute, such that a plurality of security events associated with the selected security event attribute may be summarized to represent a single incident.

As a result, the number of security events in the second set of security events may be reduced for storing and/or viewing purposes.

More illustrative information will now be set forth regarding various optional architectures and features with which the foregoing technique may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
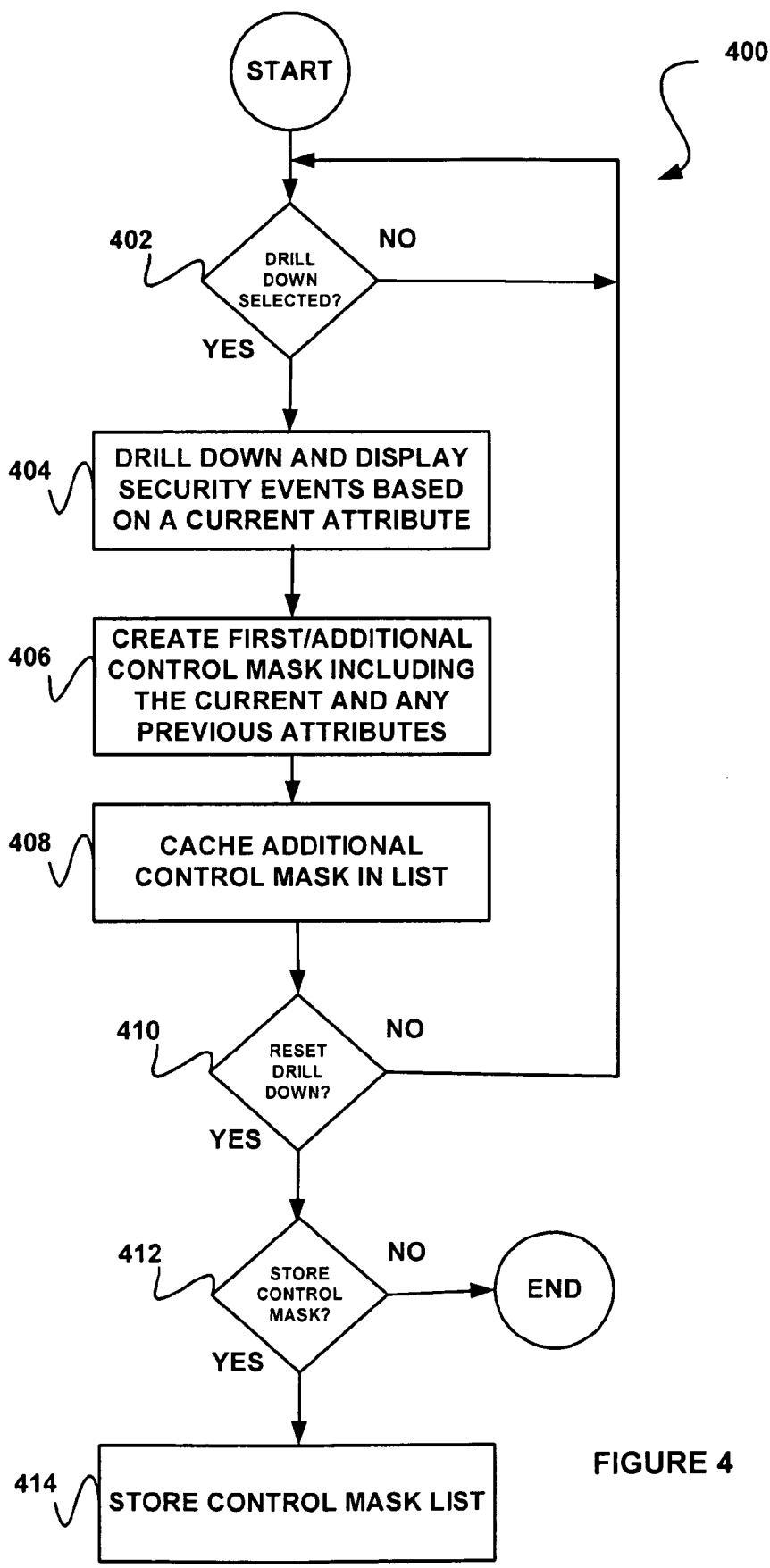
FIG. 4 shows a method for storing a control mask, in accordance with another embodiment.

FIG. 4 shows a method 400 for storing a control mask, in accordance with another embodiment. As an option, the method 400 may be implemented in the context of the architecture and environment of FIGS. 1-3. Of course, however, the method 400 may be carried out in any desired environment. It should also be noted that the aforementioned definitions may apply during the present description.

As shown in decision 402, it is decided whether a drill down has been selected. The drill down may include computer code capable of correlating and/or aggregating security events. In particular, for a set of security events, a drill down may optionally aggregate security events within the set of security events that have the same or similar value for a given attribute.

If it is decided in operation 402 that a drill down has been selected, security events are drilled down and displayed based on selection criteria. The selection criteria may include security event attributes selected and/or configured by a user, for example. In one optional embodiment, the selection criteria may be in the form of <attribute> operation <value>.

Table 1 illustrates examples of selected and/or configured security event attributes used in selection criteria. Such attributes are set forth by way of example only, and should not be construed as limiting in any way.

TABLE 1

Severity == [High OR Medium]
Source Classless Inter-Domain Routing (CIDR) IP address == 10.0.0.0/8

Thus, security events with the same or similar attribute values may be correlated and/or aggregated. In this way, a single instance of a plurality of security events with the same or similar attribute value may be displayed. As a result, the display of a set of security events may be summarized to reduce a number of the security events displayed.

Also, a first/additional control mask that includes the current (and, if applicable, any previous attributes) may be created, as shown in operation 406. The control mask may include, for example, a set of rules (e.g. filters, policies, etc.) associated with any of the current and/or previous attribute(s). As an option, the current and/or previous attribute(s) may include any attribute(s) that has been selected during a session. Specifically, such attribute(s) may include attribute(s) associated with one or more selected drill downs, as in decision 402.

The additional control mask may then be cached in a list, as shown in operation 408. The list may include any data structure (e.g. database, etc.) capable of being maintained in cache and capable of storing a control mask. In this way, as additional drill downs are selected and thus additional attributes associated with a control mask, such control mask may continually be updated and stored in cache.

Further, it may be determined whether the drill down should be reset, as shown in decision 410. The drill down may be reset in any desired manner. Just by way of example, the drill down may be reset based on a user selection. Specifically, the user may select to reset a most recent drill down. As another option, the user may select to reset any desired number of previous drill downs. Of course, however, the user may also select to reset an entire set of drill downs. Thus, any number of drill downs, and therefore attributes, associated with a control mask may be removed from the control mask, and consequently from the cache.

If it is determined in decision 410 that the drill down should not be reset, the method 400 may continue to wait for a next selection of a drill down. In this way, the next selection of a drill down may be applied to the control mask. If, however, it is determined in decision 410 that the drill down should be reset, the drill down is reset accordingly, and it is determined whether the control mask is to be stored. Note decision 412. Such determination may be made based on a user selection to store the control mask.

If it is determined in decision 412 that the control mask is not to be stored, the method 400 may end, as shown. Alternatively, if it is determined in decision 412 that the control mask is to be stored, the control mask may be stored in a list, as shown in operation 414. In one embodiment, the control mask may be stored in permanent memory. Further, the list may include any data structure (e.g. database, etc.) capable of storing a control mask. In addition, the control mask may be stored in associated with a user-configured name. Thus, any number of control masks may be created and stored based on attributes associated with selected drill downs.

Figure 5:
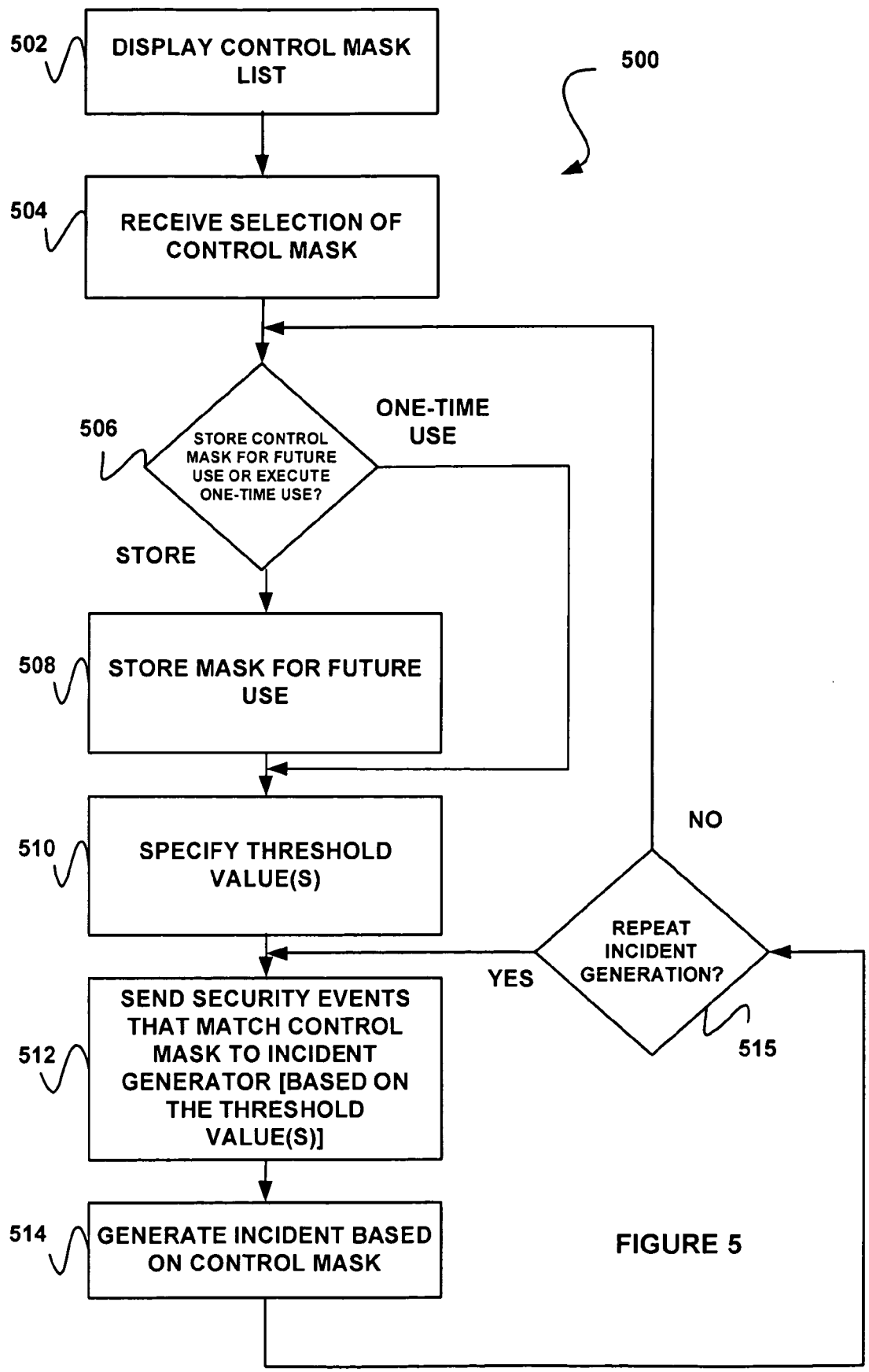
FIG. 5 shows a method for generating incidents of a plurality of security events based on a control mask, in accordance with yet another embodiment.

FIG. 5 shows a method 500 for generating incidents of a plurality of security events based on a control mask, in accordance with yet another embodiment. As an option, the method 500 may be implemented in the context of the architecture and environment of FIGS. 1-4. Of course, however, the method 500 may be carried out in any desired environment. It should also be noted that the aforementioned definitions may apply during the present description.

As shown in operation 502, a list of control masks is displayed. The list may be displayed utilizing a GUI. Each control mask in the list of control masks may optionally be displayed in detail. For example, detail on attributes, rules, filters, etc. associated with such control mask may be displayed.

A selection of a control mask in the displayed list of control masks may then be received, as shown in operation 504. Such selection may be received from a user utilizing a GUI. Additionally, it may be determined whether to store the control mask for future use or whether to execute the control mask for a one-time user. Note decision 506. Again, such determination may be made based on a user selection.

If it is determined in decision 506 that the control mask is to be stored for future use, the control mask may be stored for future use, as shown in operation 508. Specifically, the control mask may be stored in permanent memory. As an option, the control mask may be stored in a database with a group of control masks, all of which are stored for future use. Thus, the control mask may be stored such that it may be utilized automatically, as will be described below with respect to operation 512. The method 500 may then continue in operation 510 where at least one threshold value may be specified.

If it is determined in decision 506 that the control mask is not to be stored for future use but is only to be used on a one-time basis, at least one threshold value may be immediately specified after operation 504, as shown in operation 510. The threshold value may include, for example, a number of security events to be correlated and/or aggregated based on the control mask, a time period (e.g. 5 minutes, 1 hour, etc.) in which security events are correlated and/or aggregated based on the control mask, and/or any other threshold capable of being associated with a control mask.

Security events that match the control mask are then sent to an incident generator based on any specified threshold values, as shown in operation 512. In one optional embodiment, security events that meet rules associated with the control mask, and therefore attributes associated with the control mask, may be identified based on any specified thresholds. Just by way of example, security events of a particular type that occurred within a 1 hour time period may be identified.

Such security events may then be sent to the incident generator. Such security events may be sent with data (e.g. rules, filters, attributes, identifiers, etc.) associated with the particular control mask. The incident generator may include any computer code capable of generating incidents of security events. Specifically, the incident generator may generate incidents of security events for displaying such incidents. Therefore, for all control masks that are stored for future use, such control masks may be automatically and continually utilized to send matching security events to the incident generator based on any specified threshold values.

An incident may then be generated based on the control mask, as shown in operation 514. As an option, the incident may be generated by correlating and/or aggregating the security events according to any of the data accompanied therewith. In one specific example, an incident may be generated every hour (e.g. any desired time threshold) for a plurality of security events that occurred during that hour that match a particular control mask. Thus, a plurality of security events that match the control mask and meet any specified thresholds may be correlated and aggregated into an incident. In this way, the number of incidents that are displayed and/or reported to a user may optionally be reduced.

Operation 512 and 514 can be repeated indefinitely, if so desired by the user, to automatically generate incidents based on future security events. A user can even specify such preference in decision 515. In decision 515, a user can specify an additional event handling operation so that the incident can be handled automatically once created. Such operations can significantly relieve a workload of a human operator because known security events are dealt with by a computer program automatically.

Figure 6:
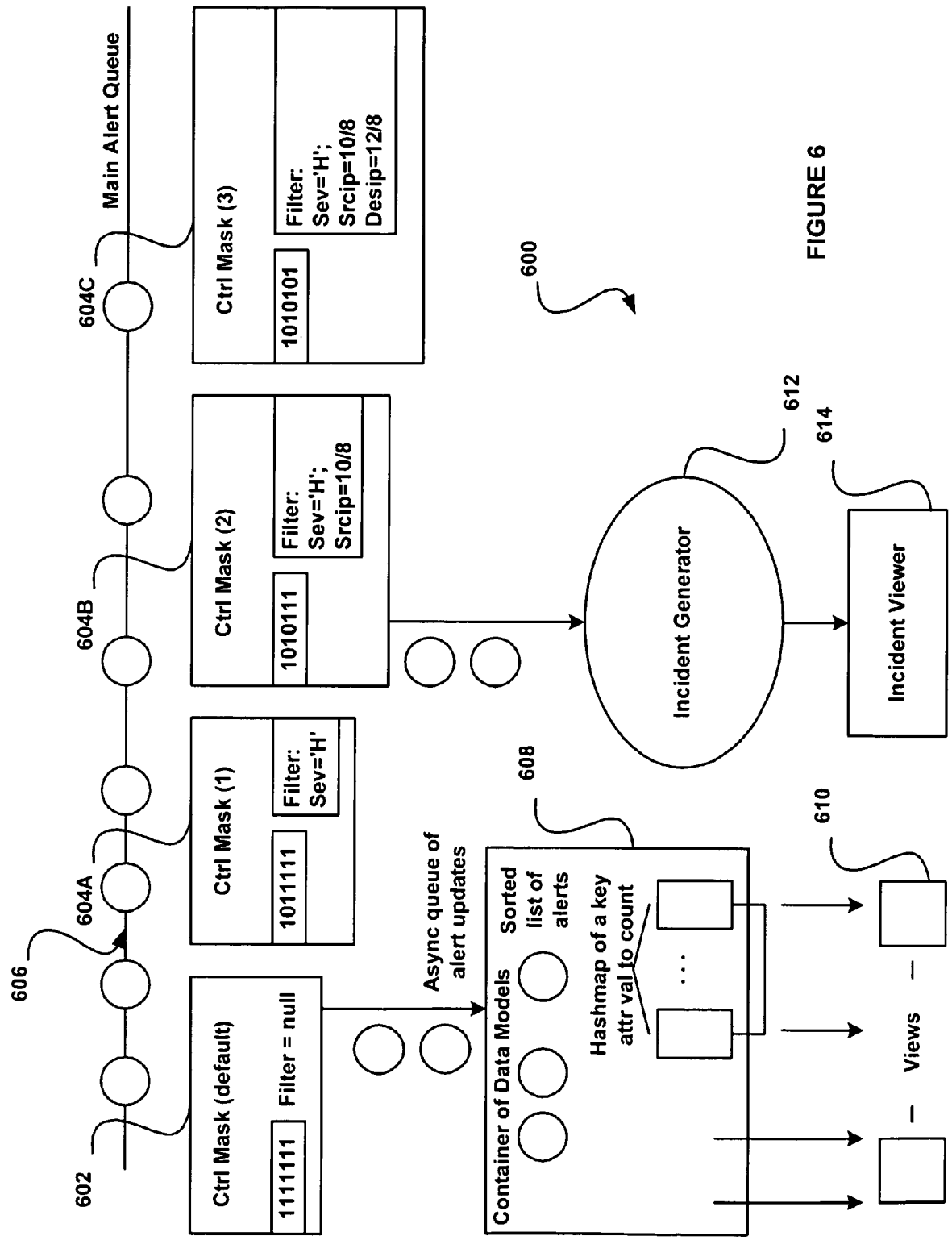
FIG. 6 shows a system for automatically summarizing security events, in accordance with another embodiment.

FIG. 6 shows a system 600 for automatically summarizing security events, in accordance with another embodiment. As an option, the system 600 may be implemented in the context of the architecture and environment of FIGS. 1-5. Of course, however, the system 600 may be carried out in any desired environment. It should also be noted that the aforementioned definitions may apply during the present description.

As shown, a default control mask 602 and user configured control masks 604A-C may receive security events from a main security event queue 606 that receives all security events. Specifically, the default control mask 602 and the user configured control masks 604A-C may each receive security events that match associated rules and/or attributes of such control masks 604A-C. As another option, the default control mask 602 and the user configured control masks 604A-C may each receive all security events from the main security event queue 606 and may filter such security events based on rules and/or attributes associated therewith. The default control mask 602 may optionally include a null filter, such that all security events pass through the default control mask 602.

In one embodiment, the default control mask 602 may send filtered security events to a container 608. Such filtered security events may be sent to the container 608 periodically. For example, the filtered security events may be sent to the container 608 every instance of a predefined period of time. The container 608 may sort the security events into a list. Such list may be sorted in any desired manner. The security events may then be displayed in user-generated views 610. Of course, it should be noted that the user configured control masks 604A-C may also send filtered security events associated therewith to the container 608 (not shown).

In another embodiment, the user configured control masks 604A-C may send filtered security events to an incident generator 612. Again, such security events may be sent to the incident generator 612 periodically (e.g. every instance of a predetermined period of time, etc.). The incident generator 612 may then aggregate security events per the control mask. In this way, a single incident of the security event may be generated and displayed in an incident viewer 614.

Figure 7:
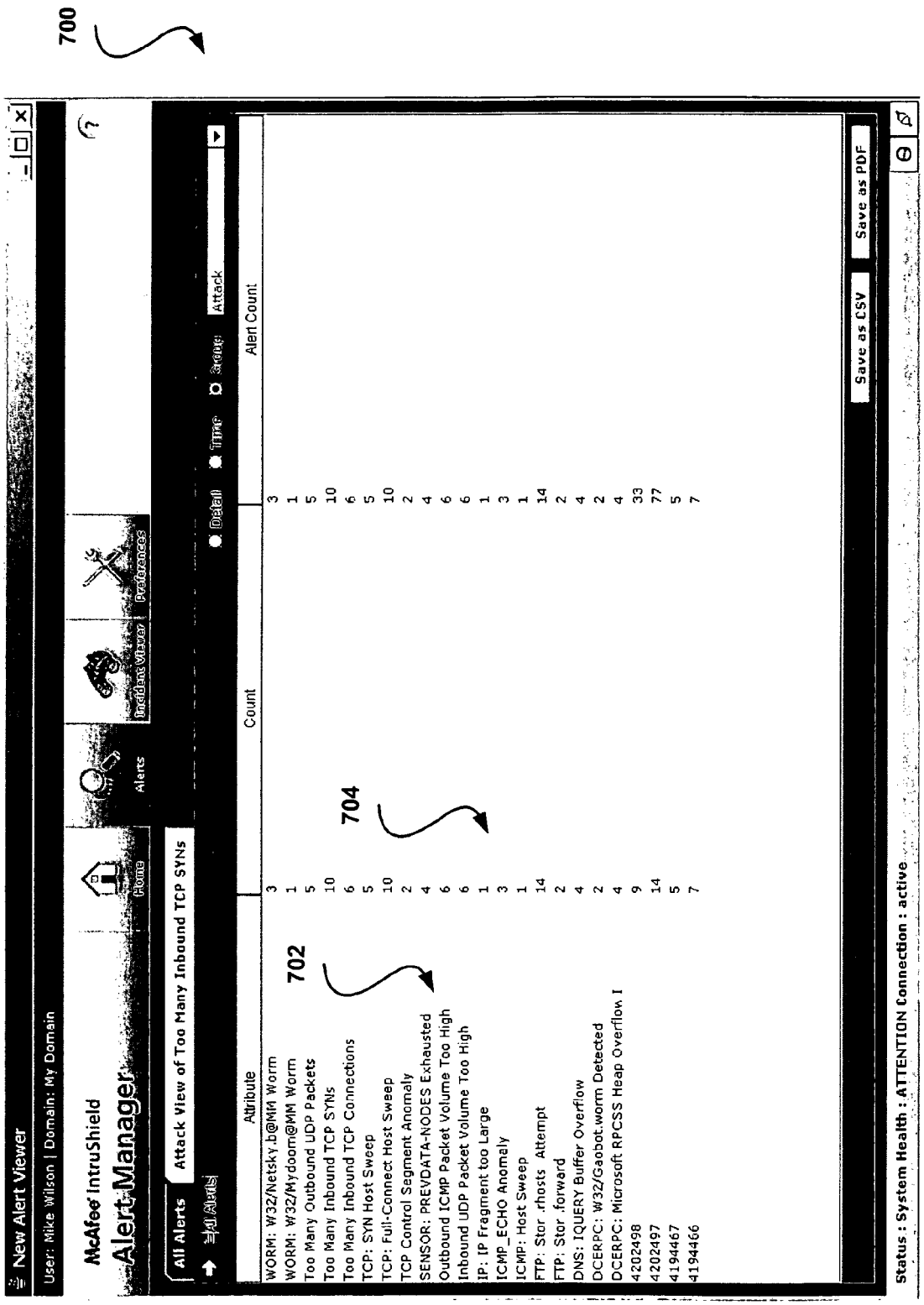
FIG. 7 shows a graphical user interface (GUI) for displaying security events that have been summarized based on control masks, in accordance with one embodiment.

FIG. 7 shows a GUI 700 for displaying security events that have been summarized based on control masks, in accordance with one embodiment. As an option, the GUI 700 may be implemented in the context of the architecture and environment of FIGS. 1-6. Of course, however, the GUI 700 may be carried out in any desired environment. It should also be noted that the aforementioned definitions may apply during the present description.

As shown, a plurality of security event instances 702 are displayed. The security event instances 702 are each shown as single instances such that the GUI 700 does not display duplicate security events. Thus, such security event instances 702 may be associated with at least one control mask, such that each security event instance 702 may represent a plurality of security events. In particular, a number of security events 704 associated with each security event instance 702 may be displayed in association with the security event instance 702. Of course, it should be noted that duplicates of security event instances may also be displayed if such security events are not associated with any control masks (not shown).

In one embodiment, terrorism may be countered utilizing the aforementioned technology. According to the U.S. Federal Bureau of Investigation, cyber-terrorism is any "premeditated, politically motivated attack against information, computer systems, computer programs, and data which results in violence against non-combatant targets by sub-national groups or clandestine agents." A cyber-terrorist attack is designed to cause physical violence or extreme financial harm. According to the U.S. Commission of Critical Infrastructure Protection, possible cyber-terrorist targets include the banking industry, military installations, power plants, air traffic control centers, and water systems. Thus, by optionally incorporating the present technology into the cyber-frameworks of the foregoing potential targets, terrorism may be countered by automatically summarizing security events, which may be used to combat cyber-terrorism.

While various embodiments have been described above, it should be understood that they have been presented by way of example only, and not limitation. For example, any of the network elements may employ any of the desired functionality set forth hereinabove. Thus, the breadth and scope of a preferred embodiment should not be limited by any of the above-described exemplary embodiments, but should be defined only in accordance with the following claims and their equivalents.

What is claimed is:
1. A computer-implemented method, comprising:
receiving a selection of at least one security event attribute;
displaying a subset of a first set of security events based on the at least one selected security event attribute; and
storing information associated with the at least one selected security event attribute;

wherein the information is capable of being used to subsequently and automatically summarize a subset of a second set of security events;

wherein the subset of the second set of security events is summarized to reduce a number of security events that are displayed.

2. The method of claim 1, wherein the selection of the at least one security event attribute includes a request to drill down into the first set of security events.

3. The method of claim 1, wherein the displaying and the storing are repeated for a plurality of selected security event attributes.

4. The method of claim 1, wherein the information includes a control mask.

5. The method of claim 1, wherein the information includes at least one filter.

6. The method of claim 1, wherein the information includes a plurality of filters.

7. The method of claim 6, wherein the information includes at least one filter for each of a plurality of selected security event attributes.

8. The method of claim 1, wherein the subset of the second set of security events is summarized into a single event.

9. The method of claim 1, wherein the information is input into an incident generator.

10. The method of claim 1, wherein the subset of the second set of security events is summarized to represent a single incident.

11. The method of claim 1, wherein the information is displayed in a list for selection by a user.

12. The method of claim 11, wherein the information is used to subsequently display the subset of the second set of security events, in response to the selection of the information in the list.

13. The method of claim 1, wherein the first set of security events is collected during a first user-selected time frame.

14. The method of claim 13, wherein the second set of security events is collected during a second user-selected time frame, and at least a portion of the second user-selected time frame is subsequent to the first user-selected time frame.

15. The method of claim 1, wherein the storing and incident generation is performed in real-time.

16. The method of claim 1, wherein the first set of the security events and the second set of the security events are representative of potential network intrusions.

17. The method of claim 1, wherein the displaying of the subset of the first set of security events is performed for combating terrorism.

18. A computer program product embodied on a computer readable medium, comprising:

identifying at least one security event attribute;

displaying a subset of a first set of security events based on the at least one security event attribute; and storing information associated with the at least one security event attribute;

wherein the information is capable of being used to subsequently and automatically summarize a subset of a second set of security events;

wherein the subset of the second set of security events is summarized to reduce a number of security events that are displayed.

19. A system, comprising:

a graphical user interface for receiving a selection of at least one security event attribute;

the graphical user interface displaying a subset of a first set of security events based on the at least one selected security event attribute; and a database for storing information associated with the at least one selected security event attribute;

wherein the information is capable of being used to subsequently and automatically summarize a subset of a second set of security events;

wherein the subset of the second set of security events is summarized to reduce a number of security events that are displayed.

20. The method of claim 1, wherein the at least one security event attribute includes a severity level indicating a potential damage of an attack.

21. The method of claim 1, wherein the at least one security event attribute includes a type indicating a general intrusion mechanism.

22. The method of claim 1, wherein automatically summarizing the subset of the second set of security events includes correlating security events in the subset of the second set of security events based on the at least one selected security event attribute.

* * * * *